(12) United States Patent
Wang et al.

(10) Patent No.: US 11,488,302 B2
(45) Date of Patent: Nov. 1, 2022

(54) OBJECT RECOGNITION METHOD AND DEVICE, AND STORAGE MEDIUM

(71) Applicant: Tencent Technology (Shenzhen) Company Limited, Shenzhen (CN)

(72) Inventors: Rui Wang, Shenzhen (CN); Xing Sun, Shenzhen (CN); Xiaowei Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 260 days.

(21) Appl. No.: 16/985,966

(22) Filed: Aug. 5, 2020

(65) Prior Publication Data

US 2020/0364863 A1    Nov. 19, 2020

Related U.S. Application Data

(63) Continuation of application No. PCT/CN2019/079692, filed on Mar. 26, 2019.

(30) Foreign Application Priority Data

May 14, 2018    (CN) .......................... 201810456463.7

(51) Int. Cl.
*G06T 7/11*        (2017.01)
*G06T 7/00*        (2017.01)
(Continued)

(52) U.S. Cl.
CPC .......... *G06T 7/0012* (2013.01); *G06K 9/6256* (2013.01); *G06N 3/08* (2013.01);
(Continued)

(58) Field of Classification Search
CPC .. G06K 9/6256; G06K 9/6273; G06N 3/0454; G06N 3/08; G06T 2207/10081;
(Continued)

(56) References Cited

U.S. PATENT DOCUMENTS 6,058,322 A  *  5/2000  Nishikawa ............ G06T 7/0012
                                                382/128
9,092,691 B1 *  7/2015  Beaumont ............. G06T 7/0014
                        (Continued)

FOREIGN PATENT DOCUMENTS

CN    107016665 A     8/2017
CN    107480677 A    12/2017

OTHER PUBLICATIONS

Tencent Technology, ISR, PCT/CN2019/079692, Jul. 4, 2019, 2 pgs.

(Continued)

*Primary Examiner* — Tsung Yin Tsai
(74) *Attorney, Agent, or Firm* — Morgan, Lewis & Bockius LLP

(57) ABSTRACT

An object recognition method is performed at an electronic device. The method includes: pre-processing a target image, to obtain a pre-processed image, the pre-processed image including three-dimensional image information of a target region of a to-be-detected object, processing the pre-processed image by using a target data model, to obtain a target probability, the target probability being used for representing a probability that an abnormality appears in a target object in the target region of the to-be-detected object; and determining a recognition result of the target region of the to-be-detected object according to the target probability, the recognition result being used for indicating the probability that the abnormality appears in the target region of the to-be-detected object. The object recognition method can effectively improve accuracy of object recognition and avoid a case of incorrect recognition.

18 Claims, 6 Drawing Sheets

(51) Int. Cl.
*G06K 9/62* (2022.01)
*G06N 3/08* (2006.01)
*G06V 10/44* (2022.01)

(52) U.S. Cl.
CPC ............... *G06T 7/11* (2017.01); *G06V 10/44* (2022.01); *G06T 2207/30064* (2013.01)

(58) Field of Classification Search
CPC . G06T 2207/20081; G06T 2207/20084; G06T 2207/30064; G06T 2207/30096; G06T 7/0012; G06T 7/11; G06V 10/32; G06V 10/44; G06V 10/454; G06V 10/82; G06V 20/653; G06V 2201/031
See application file for complete search history.

(56) References Cited

U.S. PATENT DOCUMENTS

| | | | | |
|---|---|---|---|---|
| 10,004,471 B2* | 6/2018 | Madabhushi | .......... | A61B 6/032 |
| 10,078,791 B2* | 9/2018 | Justice | .................... | G06T 7/277 |
| 10,121,104 B1* | 11/2018 | Hu | ........................ | G06N 3/0454 |
| 11,049,243 B2* | 6/2021 | Odry | ........................ | G06V 10/764 |
| 2003/0095692 A1* | 5/2003 | Mundy | ................. | G06T 7/0012 |
| | | | | 382/128 |
| 2008/0002870 A1* | 1/2008 | Farag | .................... | G06K 9/6215 |
| | | | | 382/209 |
| 2008/0130825 A1* | 6/2008 | Fu | ........................... | G06T 7/248 |
| | | | | 378/8 |
| 2011/0075920 A1* | 3/2011 | Wu | ....................... | G06V 10/457 |
| | | | | 382/160 |
| 2013/0197370 A1* | 8/2013 | Burlina | ................ | A61B 5/7264 |
| | | | | 600/476 |
| 2014/0003695 A1* | 1/2014 | Dean | ................... | A61F 2/30942 |
| | | | | 382/131 |
| 2016/0364862 A1* | 12/2016 | Reicher | ................ | G06F 40/205 |
| 2017/0046616 A1* | 2/2017 | Socher | ................... | G06V 10/96 |
| 2017/0169567 A1* | 6/2017 | Chefd'hotel | ......... | G06N 3/0454 |
| 2018/0089840 A1* | 3/2018 | Yan | ........................ | G06V 10/772 |
| 2018/0144209 A1* | 5/2018 | Kim | ........................ | G06N 3/08 |
| 2018/0165809 A1* | 6/2018 | Stanitsas | ............. | G06F 3/04847 |
| 2019/0138830 A1* | 5/2019 | Justice | .................. | G06V 20/46 |
| 2020/0012881 A1* | 1/2020 | Justice | .................. | G06V 10/82 |
| 2020/0020098 A1* | 1/2020 | Odry | ...................... | G06V 10/84 |
| 2021/0303928 A1* | 9/2021 | Xu | ........................ | A61B 5/004 |

OTHER PUBLICATIONS

Tencent Technology, WO, PCT/CN2019/079692, Jul. 4, 2019, 4 pgs.
Tencent Technology, IPRP, PCT/CN2019/079692, Nov. 17, 2020, 5 pgs.

* cited by examiner

OBJECT RECOGNITION METHOD AND DEVICE, AND STORAGE MEDIUM

CROSS REFERENCE TO RELATED APPLICATIONS

This application is a continuation application of PCT Patent Application No. PCT/CN2019/079692, entitled "OBJECT RECOGNITION METHOD AND APPARATUS, AND STORAGE MEDIUM", filed on Mar. 26, 2019, which claims priority to Chinese Patent Application No. 201810456463.7, filed with the Chinese Patent Office on May 14, 2018 and entitled "OBJECT RECOGNITION METHOD AND APPARATUS, AND STORAGE MEDIUM", all of which are incorporated herein by reference in their entirety.

FIELD OF THE TECHNOLOGY

This application relates to the field of computers, and specifically, to an object recognition technology.

BACKGROUND OF THE DISCLOSURE

At present, when recognizing whether lung nodules of a lung cancer patient possess invasion (whether cancer metastasis occurs), a conventional machine learning algorithm is usually used, that is, segmenting an image into image blocks, recognizing whether lung nodules exist therein and determining whether the lung nodules are benign or malignant based on the image blocks obtained after segmentation, and recognizing the invasion of a malignant lung nodule.

Accuracy of the foregoing object recognition method depends on reasonableness of image block segmentation. However, because a position where the lung nodule appears is highly uncertain, a case of incorrect recognition is apt to happen when performing object recognition by using the foregoing method.

SUMMARY

According to embodiments of this application, an object recognition method and apparatus, and a storage medium are provided, to improve accuracy of object recognition.

According to a first aspect of this application, an object recognition method is provided, applied to an electronic device, the method including:

pre-processing a target image, to obtain a pre-processed image, the pre-processed image including three-dimensional image information of a target region of a to-be-detected object;

processing the pre-processed image by using a target data model, to obtain a target probability, the target probability being used for representing a probability that an abnormality appears in a target object in the target region of the to-be-detected object, and the target data model being obtained by training a convolutional neural network by using a plurality of sets of data; each of the plurality of sets of data including the three-dimensional image information of the target region of a sample object and indication information corresponding to the three-dimensional image information, the indication information being used for indicating whether the abnormality appears in the target object in the target region of the sample object, and the three-dimensional image information of the target region of the sample object being at least used for representing the target object in the target region of the sample object; and determining a recognition result of the target region of the to-be-detected object according to the target probability, the recognition result being used for indicating the probability that the abnormality appears in the target region of the to-be-detected object.

According to a second aspect of this application, an electronic device is provided, including a processor and a memory;

the memory being configured to store a plurality of computer programs; and the processor being configured to execute the computer programs stored in the memory, to perform the object recognition method according to the foregoing first aspect.

According to a third aspect of this application, a non-transitory computer readable storage medium is provided, storing a plurality of computer programs, the computer programs, when executed by an electronic device having a processor, causing the processor to perform the object recognition method according to the foregoing first aspect.

BRIEF DESCRIPTION OF THE DRAWINGS

The accompanying drawings described herein are used for providing a further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

To make solutions of the present disclosure more comprehensible for a person skilled in the art, the following clearly and thoroughly describes the technical solutions in the embodiments of this application with reference to the accompanying drawings in the embodiments of this application. Apparently, the described embodiments are merely a part rather than all of the embodiments of the present disclosure. All other embodiments obtained by a person skilled in the art based on the embodiments of this application without creative efforts shall fall within the protection scope of this application.

The terms such as "first" and "second" in the specification, claims, and foregoing accompanying drawings of this application are intended to distinguish between similar objects rather than describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but can include other steps or units not expressly listed or inherent to such a process, method, product, or device.

Figure 1:
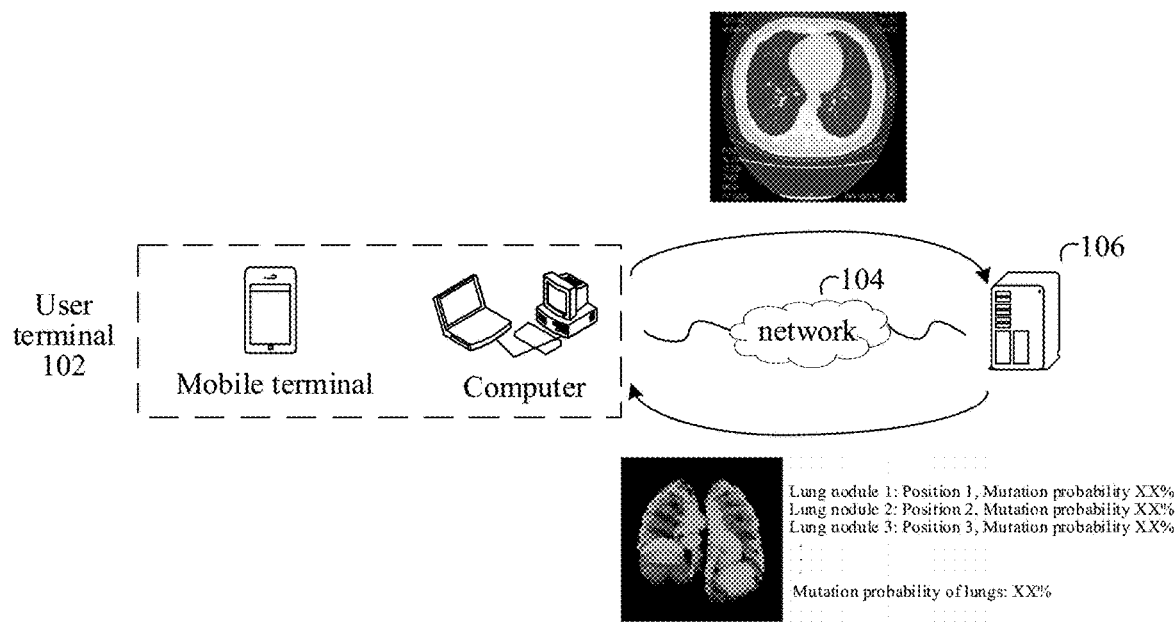
FIG. 1 is a schematic diagram of an application environment of an object recognition method according to an embodiment of this application.

According to one aspect of the embodiments of this application, an object recognition method is provided. The object recognition method can be applied to, but is not limited to, an application environment shown in FIG. 1. As shown in FIG. 1, a user terminal 102 transmits a target image (for example, a CT image of a patient) to a server 106 via a network 104. The server 106 pre-processes the target image, to obtain a pre-processed image, the pre-processed image including three-dimensional image information (such as CT image data of lungs shown in FIG. 1) of a target region (such as the lungs shown in FIG. 1) of a to-be-detected object; the server 106 processes the pre-processed image by using a target data model, to obtain a target probability that is used for representing a probability that an abnormality appears in a target object in the target region of the to-be-detected object, the target data model being obtained by training a convolutional neural network by using a plurality of sets of data, each of the plurality of sets of data including the three-dimensional image information of the target region of a sample object and indication information corresponding to the three-dimensional image information, the indication information being used for indicating whether the abnormality appears in the target object in the target region of the sample object, the three-dimensional image information of the target region of the sample object being at least used for representing the target object in the target region of the sample object; and then the server 106 determines a recognition result of the target region of the to-be-detected object according to the target probability outputted by the target data model, the recognition result being used for indicating the probability that the abnormality appears in the target region of the to-be-detected object. The server 106 can transmit, after determining the recognition result, the recognition result to the user terminal 102. The user terminal 102 can display the received recognition result.

Optionally, in this embodiment, the foregoing user terminal can include, but is not limited to, at least one of the following: a mobile phone, a tablet computer, a personal computer (PC), and the like. The foregoing network can include, but is not limited to, a wired network or a wireless network, the wireless network including: Bluetooth, Wi-Fi, and other networks implementing wireless communication, and the wired network including: a local area network, a metropolitan area network, and a wide area network. The foregoing server can include, but is not limited to, at least one of the following: a PC and other devices used for providing computing. The foregoing is merely an example, and is not limited in this embodiment.

Figure 2:
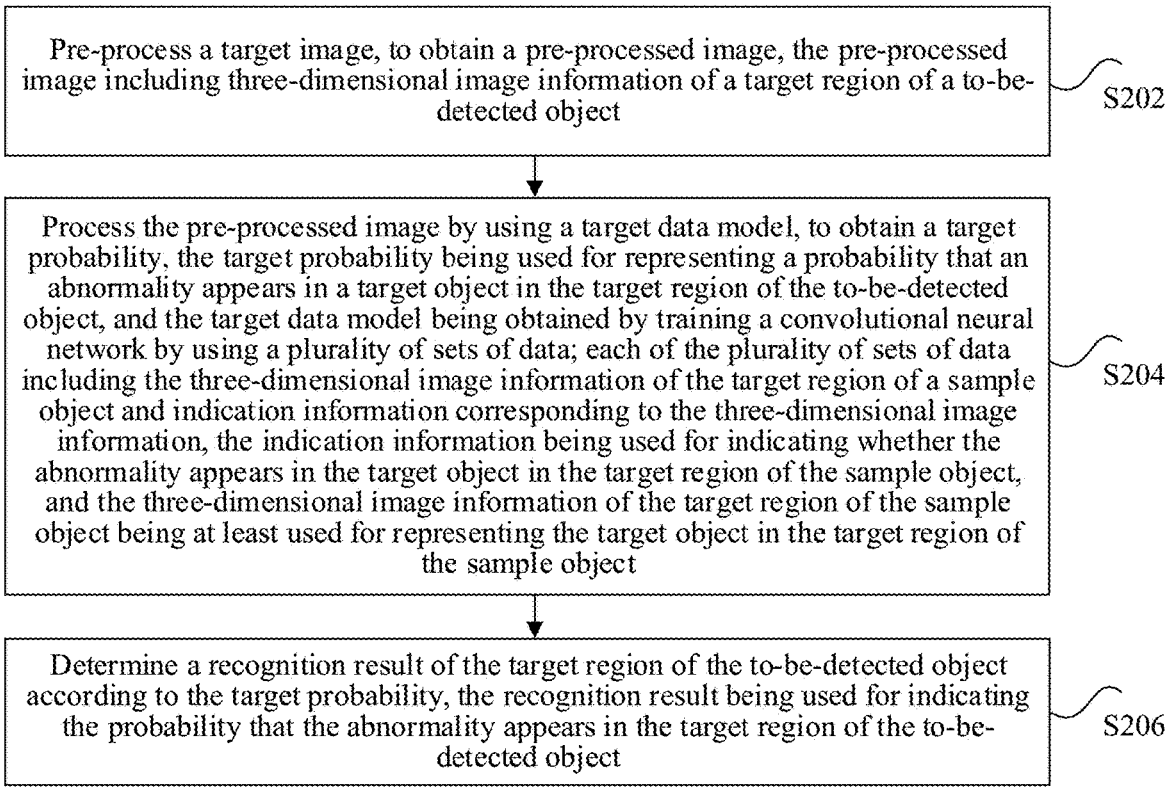
FIG. 2 is a schematic flowchart of an optional object recognition method according to an embodiment of this application.

In this embodiment, in an optional implementation, as shown in FIG. 2, the foregoing object recognition method can be applied to an electronic device, the method including the following steps:

S202. Pre-process a target image, to obtain a pre-processed image, the pre-processed image including three-dimensional image information of a target region of a to-be-detected object.

S204. Process the pre-processed image by using a target data model, to obtain a target probability, the target probability being used for representing a probability that an abnormality appears in a target object in the target region of the to-be-detected object, and the target data model being obtained by training a convolutional neural network by using a plurality of sets of data; each of the plurality of sets of data including the three-dimensional image information of the target region of a sample object and indication information corresponding to the three-dimensional image information, the indication information being used for indicating whether the abnormality appears in the target object in the target region of the sample object, and the three-dimensional image information of the target region of the sample object being at least used for representing the target object in the target region of the sample object.

S206. Determine a recognition result of the target region of the to-be-detected object according to the target probability, the recognition result being used for indicating the probability that the abnormality appears in the target region of the to-be-detected object.

The foregoing object recognition method can be applied to, but is not limited to, a recognition process of the target region of the to-be-detected object; for example, the object recognition method can be applied to a medical field, and a specific application of the method in the medical field can be recognition of pathological changes of a target organ based on a three-dimensional image of the target organ.

For example, in the medical field, the foregoing object recognition method can be used for recognizing whether a lung cancer of a lung cancer patient is invasive to surrounding tissue (being invasive corresponds to metastasis of the lung cancer, being non-invasive corresponds to non-metastasis of the lung cancer, and invasion of the lung cancer can correspond to appearance of the abnormality in the foregoing target region). During the specific application, a CT medical image of a patient can be acquired by using an image acquisition device first, and then clinical staff of a hospital can download the CT medical image through a target device of the hospital, and upload the CT medical image to an electronic device through the target device. The electronic device can be specifically a server. Then, the server determines whether the lung cancer of the diagnosed patient belongs to an invasive lung cancer or non-invasive lung cancer through the foregoing object recognition method. After determining the recognition result, the server transmits the recognition result back to the target device of the hospital. Based on the recognition result, the medical staff can evaluate whether the lung cancer of the patient belongs to the invasive lung cancer or non-invasive lung cancer, that is, evaluate whether metastasis occurs in the lung cancer of the patient, and then use the recognition result as a reference factor for designing a treatment plan.

In this embodiment, a target image is pre-processed, to obtain a pre-processed image, the pre-processed image including three-dimensional image information of a target region of a to-be-detected object.

Before the pre-processing a target image, to obtain a pre-processed image, a target server (namely, an electronic device) can receive the target image transmitted by a target device. The target device can log in to the target server by using a registered account, and upload the target image to the target server. The target device can further receive the target image transmitted by the device that logs in by using the registered account, and forward the received target image to the server.

The target image includes three-dimensional image information of the to-be-detected object, the three-dimensional image information of the to-be-detected object including the three-dimensional image information of the target region and three-dimensional image information of a bone area around the target region. The target image can be a Computed Tomography (CT) image of the to-be-detected object, or an image obtained by other means that can obtain the three-dimensional image information of the target region of the to-be-detected object.

In this embodiment, the pre-processing a target image, to obtain a pre-processed image can include: performing contour detection on the target image, and extracting a target region of a to-be-detected object from the target image, to obtain an extracted image; interpolating each image voxel in the extracted image into a specified space size, to obtain an interpolated image; and normalizing an intensity of each image voxel in the interpolated image into a target value, to obtain the pre-processed image.

It is to be understood that, in addition to the three-dimensional image information of the target region of the to-be-detected object, the target image can further include the three-dimensional image information of surrounding areas of the target region of the to-be-detected object. Correspondingly, when pre-processing the target image, contour detection can be performed on the target image, and based on morphological features of the target region, the target region of the to-be-detected object can be extracted from the target image, to obtain the extracted image.

In order to ensure a better display effect of the extracted image, before an electronic device extracts the target region of the to-be-detected object, a suppression technology can be first used for suppressing influences of the surrounding areas of the target region on a target object.

After obtaining the extracted image, the electronic device can interpolate, through an interpolation method, each image voxel (namely, a volume pixel of an image) in the extracted image into a specified space size (for example, 1 mm*1 mm*1 mm), to obtain the interpolated image, to normalize all data into the same size of space.

After obtaining the interpolated image, the electronic device further normalizes the intensity of each image voxel in the interpolated image into the target value, to obtain the pre-processed image. The target value can be within a predetermined range (for example, 0 to 255).

Figure 3:
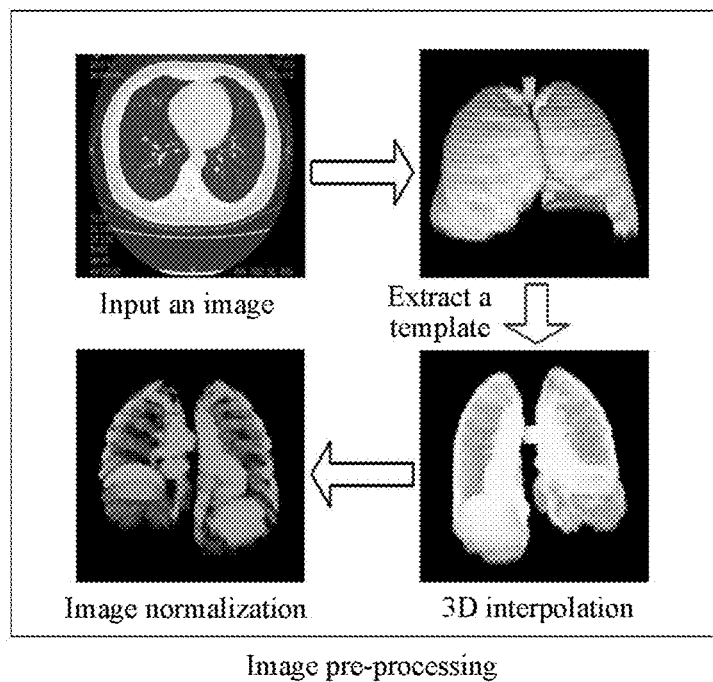
FIG. 3 is a schematic diagram of an optional image pre-processing procedure according to an embodiment of this application.

The foregoing pre-processing process is described below in combination with the following examples. As shown in FIG. 3, the electronic device receives an inputted image, that is, a CT medical image of a lung cancer patient A uploaded by the hospital, and pre-processes the received CT medical image, the pre-processing process being as follows:

S1. Suppress the influences of a surrounding bone area of lungs on detection of lung nodules by using a CT bandwidth suppression technology.

S2. Extract a 3D area of connected lung lobes by using an image morphology technology, to reduce influences of false positive signals in a non-lobar area.

S3. Interpolate each voxel into 1 mm*1 mm*1 mm through a 3D interpolation method, to normalize all data into the same size of space.

S4. Normalize the intensity of the image voxel into the range of 0 to 255.

Through the foregoing series of image morphology operations, a complete area of lungs can be extracted, and interferences of a surrounding sternum or tissue around the lungs can be eliminated. The pre-processed image can be obtained after pre-processing the foregoing CT image data of the lungs.

In this embodiment, the processing the pre-processed image by using a target data model, to obtain a target probability, the target probability being used for representing a probability that an abnormality appears in a target object in the target region of the to-be-detected object can include: processing the pre-processed image by using the target data model, to obtain the target object in the target region of the to-be-detected object; determining a target feature, the target feature being used for representing a target space range centered on the target object in the target region of the to-be-detected object; and calculating the target probability by using the target feature.

The target object in the target region can be any object in the target region in which the abnormality appears, and the target object can be detected through three-dimensional image data. A position of the target object in the target region can be arbitrary; for example, the target object can be located on the outer surface of the target region, or can be located inside or on the inner surface of the target region; and for another example, the target object can be located on an upper end, a lower end, a left end, a right end, or the like, of the target region. There can be one or more target objects. Features such as sizes, morphologies, positions and abnormal states of different target objects can be the same or different. The target data model can obtain the probabilities that the abnormality appears in the different target objects by analyzing three-dimensional image information.

In a case of determining that the abnormality appears in the target object or the target region, whether the target object is benign or malignant, or whether the malignant target object is invasive (whether the malignant target object metastasizes to surrounding tissue), can be further determined.

For example, the to-be-detected object is patient A, a target image is a chest CT image of the patient A, the target region of the to-be-detected object is lungs of the patient A, and the target object in the target region of the to-be-detected object is a lung nodule. A case that the abnormality appears in the target object includes: the lung nodule being malignant, or the malignant lung nodule being invasive.

The target data model can be any convolutional neural network that can perform target object recognition based on the three-dimensional image information. The target data model is obtained by training the convolutional neural network by using a plurality of sets of data (sample data) and optimizing parameters of the convolutional neural network model. The convolutional neural network can be a 3D convolutional neural network.

The convolutional neural network is a deep model, similar to an ordinary neural network, being composed of neurons with learnable weights and offset constants, and significantly reducing complexity of the network by two means, namely, local connection and global sharing. The 3D convolutional neural network is similar to a 2D convolutional neural network in structural system, and different from the 2D convolutional neural network in that, because of usage of a 3D convolution kernel, the 3D convolutional neural network can capture distinguishing features in a 3D spatial dimension. Because medical image data is usually obtained in a 3D acquisition manner, the 3D convolutional neural network is very effective for processing the medical image data.

An example of the 3D convolutional neural network can be a U-Net. The U-Net is a convolutional neural network based on encoder-decoder structures, and is usually used for performing image segmentation tasks. An encoder structure reduces a spatial dimension and extracts an image semantic feature through a pooling layer, and a decoder structure repairs object details and recovers the spatial dimension through a deconvolution layer. There is a shortcut connection between the encoder and the decoder, to help the decoder recover the details of the target better. The U-Net usually performs targeted structural modification according to different image processing tasks, and can be applied to tasks of image recognition, target detection, or semantic segmentation.

In this embodiment, before the pre-processing a target image, to obtain a pre-processed image, a target data model can be obtained by training a convolutional neural network by using the foregoing plurality of sets of data: obtaining three-dimensional image information of a target region of a sample object in each of the plurality of sets of data and indication information corresponding to the three-dimensional image information, the indication information being used for indicating whether an abnormality appears in a target object in the target region of the sample object; and training the convolutional neural network by using the three-dimensional image information of the target region of the sample object in each of the plurality of sets of data and the indication information corresponding to the three-dimensional image information, to obtain the target data model.

For example, when training the target data model used for recognizing invasion of a lung cancer, feature information useful for classification tasks can be learned automatically based on classification mark information of invasion and non-invasion of a lung nodule in a plurality of sets of chest CT image data, to obtain a lung nodule detection network (a 3D convolutional neural network); and a candidate nodule area, useful for recognition of the benign or malignant lung nodule and recognition of the invasion of the lung cancer in a later stage, can be found through the lung nodule detection network.

The convolutional neural network can include a plurality of parameters, and the parameters can be set to predetermined values first. Each of the plurality of sets of data used for training the model is inputted into the convolutional neural network, and the convolutional neural network is trained, to adjust values of the parameters in the convolutional neural network. The values of the parameters in the convolutional neural network are optimized and adjusted through the training of the plurality of sets of data, to obtain the target data model.

Before obtaining a probability that an abnormality appears in a target object in the target region of the to-be-detected object, that is, before obtaining a target probability, the target data model can first be used for processing the pre-processed image, to determine the target object in the target region of the to-be-detected object.

In this embodiment, a pre-processed image is processed by using a first residual block and a pooling layer in a target data model, to extract a high-level semantic feature contained in the pre-processed image; the high-level semantic feature is processed by using a second residual block and a deconvolution layer in the target data model, to recover a resolution feature of a target object used for parsing a target resolution from the high-level semantic feature; and the target object in a target region of a to-be-detected object is parsed out according to the resolution feature.

The target data model can be specifically a data model built based on a structure of a 3D convolutional neural network, and the data model can fully combine feature information of different dimensions of data and more accurately perform detection of the target object (such as a lung nodule); and the 3D convolutional neural network can learn a relationship between a candidate area of the target object (the lung nodule) and morphology of surrounding tissue, conducive to evaluating whether an abnormality appears in the target object (the lung nodule) and a target region (lungs) (for example, whether a cancer cell is invasive).

In order to solve a usual problem of degradation easily appearing when training a deep convolutional neural network, that is, a training effect of a deep network being worse than that of a shallow network, a residual block structure can be added to the convolutional neural network. By adding an identity shortcut connection, an identity mapping of the network becomes a zero mapping, making it easier to optimize the network.

Specifically, feature dimension reduction can be performed on inputted data (for example, the pre-processed image obtained after normalization, including three-dimensional image information of the target region) through one or more pooling layers in the target data model, to extract the high-level semantic feature. Feature dimension reduction can alternatively be performed on the inputted data through one or more residual blocks and one or more pooling layers in the target data model, to extract the high-level semantic feature. The feature representation capability of the convolutional neural network model can be improved by adding the residual block structure to the convolutional neural network model, to prevent gradient vanishing and model degradation, thereby improving recognition accuracy of a complex object recognition task.

Figure 4:
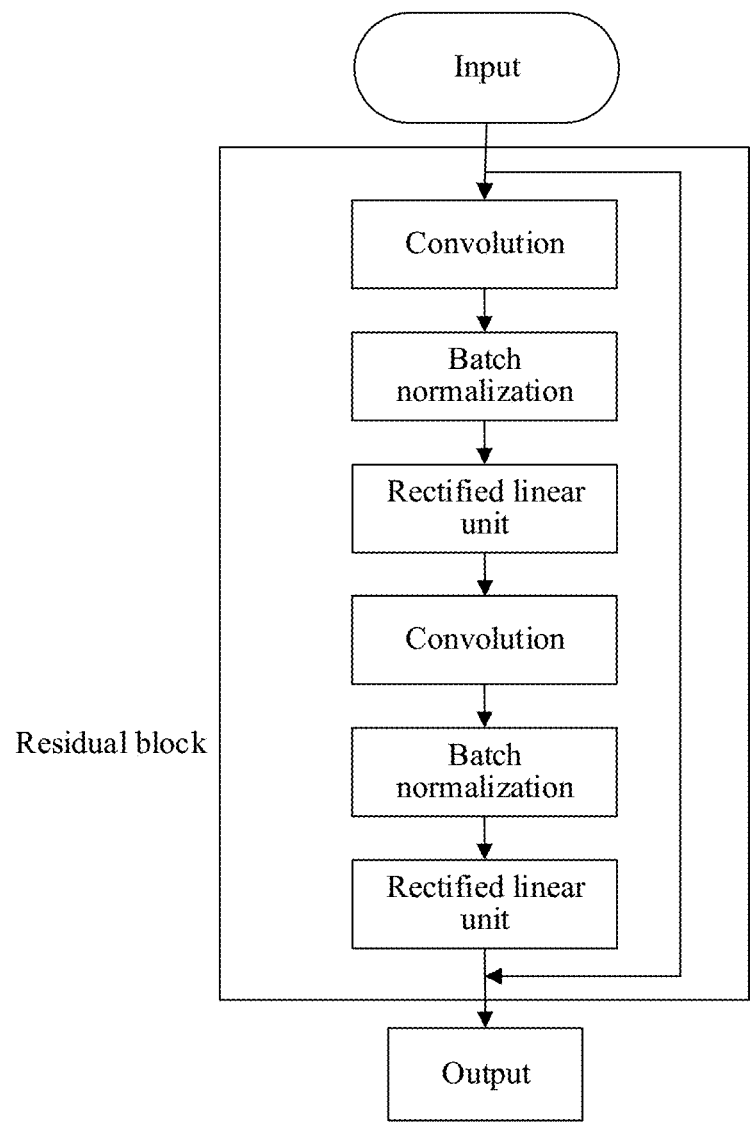
FIG. 4 is a schematic diagram of optional processing of a residual block according to an embodiment of this application.

A data processing process of the residual block can be shown in FIG. 4, and an input of the residual block can be the pre-processed image or data obtained after an action of the pooling layer.

After the target data model extracts the foregoing high-level semantic feature, the extracted high-level semantic feature can be processed by using one or more deconvolution layers in the target data model, to recover the resolution feature of the target object used for parsing the target resolution from the high-level semantic feature. The target data model can alternatively process the extracted high-level semantic feature by using one or more residual blocks and one or more deconvolution layers in the target data model, to recover the resolution feature of the target object used for parsing the target resolution from the high-level semantic feature.

Then, the target data model can parse out the target object in the target region of the to-be-detected object according to the resolution feature. Specifically, an anchor generation mechanism and a target box regression mechanism that are similar to an SSD algorithm can be used for generating the target object in the target region of the to-be-detected object.

Figure 5:
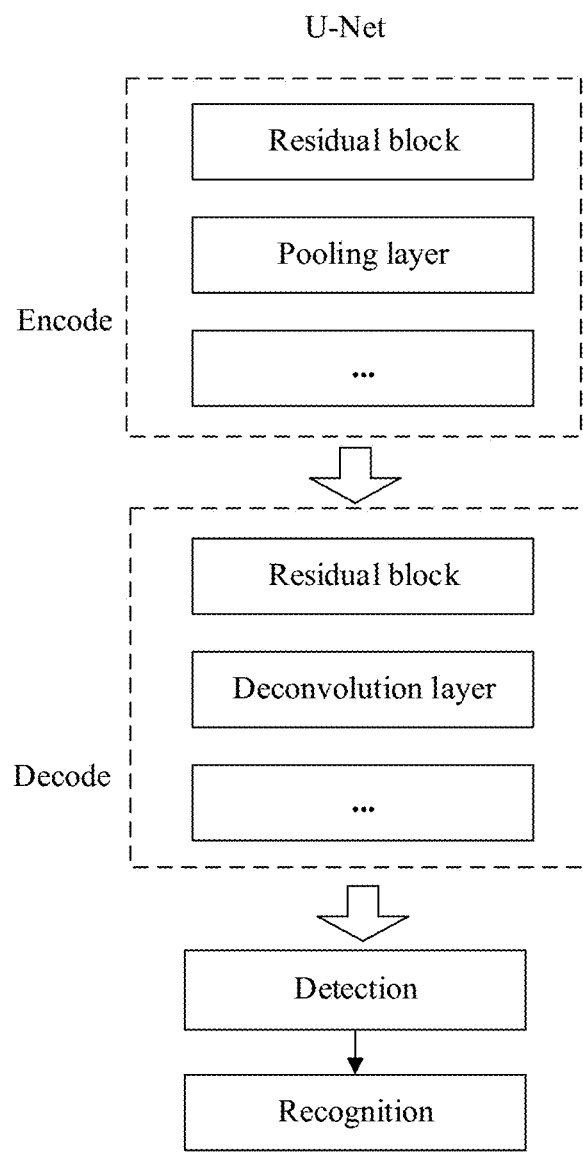
FIG. 5 is a schematic diagram of an optional U-Net according to an embodiment of this application.

As shown in FIG. 5, taking a U-Net as an example, feature dimension reduction is performed through actions of 4 residual blocks and 4 pooling layers in a U-Net encoding stage, to extract a high-level semantic feature; then in a U-Net decoding stage, a feature that is used for parsing a specific resolution of nodules is obtained through actions of 2 residual blocks and 2 deconvolution layers; and then a target object is obtained through detection and classification based on the feature.

After obtaining the target object, a target data model can determine a target space range centered on the target object in a target region of a to-be-detected object as a target feature, and calculate, by using the target feature, a target probability that an abnormality appears in the target object in the target region of the to-be-detected object.

Specifically, when determining the foregoing target feature, the target object can be mapped first to a last convolutional feature layer of the target data model, and then a feature map of a specific range around the center of the target object (for example, 2*2*2*128) is extracted and taken as the target feature; and then max pooling is performed on the feature map, and a probability value corresponding to the target feature is calculated according to weights of features in the last convolutional feature layer, the probability value being the target probability representing the probability that the abnormality appears in the target object in the target region of the to-be-detected object.

In this embodiment, the determining a recognition result of the target region of the to-be-detected object according to the target probability can include: selecting target probabilities that the abnormality appears in a target quantity of target objects; and determining the recognition result of the target region of the to-be-detected object through a Bayes's rule by using the selected target probabilities.

After obtaining the probabilities that the abnormality appears in the target objects in the target region of the to-be-detected object, that is, after obtaining the target probabilities, the probability that the abnormality appears in the target region of the to-be-detected object (the recognition result) can be determined according to the target probabilities respectively corresponding to all of the target objects; or, a target quantity of target objects can be selected from all of the target objects, and the probability that the abnormality appears in the target region of the to-be-detected object can be determined according to the target probabilities respectively corresponding to the selected target objects.

Specifically, when selecting the target objects, an electronic device can perform selection according to confidence levels of the target objects. The confidence levels of the target objects can be specifically embodied in rating values respectively corresponding to the target objects; a higher rating value of a target object indicates a higher confidence level of the target object. The confidence levels of the target objects can be specifically calculated based on weights of features in a last convolutional feature layer of a target data model.

After selecting the target objects, the electronic device can first obtain the probabilities that the abnormality appears in the selected target objects, that is, obtain the target probabilities respectively corresponding to the selected target objects, and then calculate the probability that the abnormality appears in the target region through a Bayes's rule according to the target probabilities respectively corresponding to the selected target objects.

In this embodiment, after determining a recognition result of a target object, the recognition result of a target region of a to-be-detected object can be transmitted to a target device.

Apart from transmitting the recognition result to the target device, the electronic device can also transmit the following data to the target device: a target image, a pre-processed image, a position of a target object in the foregoing image (the target image or the pre-processed image), and probabilities that an abnormality appears in the target objects. The position of the foregoing target object in the image, the probabilities that the abnormality appears in the target objects, and the recognition result can be displayed independent of the foregoing image (the target image or the pre-processed image), or can be marked in the foregoing image.

After receiving the recognition result, the target device can display the recognition result. In addition, the target device can alternatively forward the received recognition result to another device for display.

In the related art, accuracy of object recognition depends on reasonableness of image block segmentation. Because a position where a lung nodule appears is uncertain, a case of incorrect recognition is apt to happen when using the object recognition method. In this application, the target image is pre-processed, to obtain a pre-processed image, the pre-processed image including three-dimensional image information of the target region of the to-be-detected object; the pre-processed image is processed by using a target data model, to obtain a target probability, the target probability being used for representing the probability that the abnormality appears in the target object in the target region of the to-be-detected object; the target data model being obtained by training a convolutional neural network by using a plurality of sets of data; each of the plurality of sets of data including the three-dimensional image information of the target region of a sample object and indication information corresponding to the three-dimensional image information, the indication information being used for indicating whether the abnormality appears in the target object in the target region of the sample object, and the three-dimensional image information of the target region of the sample object being at least used for representing the target object in the target region of the sample object; and a recognition result of the target region of the to-be-detected object is determined according to the target probability, the recognition result being used for indicating the probability that the abnormality appears in the target region of the to-be-detected object. In this application, the pre-processed image is processed by using the target data model, and the recognition result is determined according to the target probability outputted by the target data model. Based on a convolutional neural network technology, the target data model fully learns feature information of different dimensions in the three-dimensional image information of the target region of the sample object in the training process, and is provided with a capability of accurately recognizing whether the abnormality appears in the target object in the target region of the to-be-detected object. Therefore, based on the target data model, the recognition result can be accurately determined, effectively improving accuracy of object recognition.

In an optional implementation, the processing the pre-processed image by using a target data model, to obtain a target probability, the target probability being used for representing a probability that an abnormality appears in a target object in the target region of the to-be-detected object includes:

S1. Process the pre-processed image by using the target data model, to obtain the target object in the target region of the to-be-detected object.

S2. Determine a target feature, the target feature being used for representing a target space range centered on the target object in the target region of the to-be-detected object.

S3. Obtain the probability that the abnormality appears in the target object in the target region of the to-be-detected object by using the target feature, that is, obtain the target probability.

Optionally, the processing the pre-processed image by using the target data model, to obtain the target object in the target region of the to-be-detected object includes:

S11. Process the pre-processed image by using a first residual block and a pooling layer in the target data model, to extract a high-level semantic feature contained in the pre-processed image.

S12. Process the high-level semantic feature by using a second residual block and a deconvolution layer in the target data model, to recover a resolution feature of the target object used for parsing a target resolution from the high-level semantic feature.

S13. Parse out the target object in the target region of the to-be-detected object according to the resolution feature.

For example, it is assumed that the target region is lungs, the target object is a lung nodule, and a convolutional neural network is a U-Net. Feature dimension reduction is performed on the pre-processed image through actions of 4 residual blocks and 4 pooling layers in a U-Net encoding stage, to extract the high-level semantic feature; and then in a U-Net decoding stage, a feature that can be used for parsing a specific resolution of nodules is obtained through actions of 2 residual blocks and 2 deconvolution layers. Then, an anchor generation mechanism and a target box regression mechanism that are similar to an SSD algorithm can be used for generating all possible candidate areas of the lung nodules (that is, areas of target objects); the candidate areas of the lung nodules are separately mapped to a last convolutional feature layer, a feature map of 2*2*2*128 around the center of the candidate areas is extracted to perform max pooling, and the probability of invasion or non-invasion of each candidate nodule is calculated.

According to this embodiment, the target data model applies a way of combining the convolutional neural network and the residual blocks, and addition of the residual blocks can improve the feature representation capability of the target data model, to prevent gradient vanishing and model degradation. Furthermore, by combining the feature layer information of different resolutions, the target data model can detect the target object more accurately, which helps to improve recognition accuracy of the abnormality of the target object.

In an optional implementation, the pre-processing a target image, to obtain a pre-processed image includes:

S1. Perform contour detection on the target image, and extract a target region of a to-be-detected object from the target image, to obtain an extracted image.

S2. Interpolate each image voxel in the extracted image into a specified space size, to obtain an interpolated image.

S3. Normalize an intensity of each image voxel in the interpolated image into a target value, to obtain the pre-processed image.

For example, assuming that the target image is a chest CT image and the target region is lungs, a CT bandwidth suppression technology is used for suppressing influences of a surrounding bone area of the lungs on detection of lung nodules; a 3D area of connected lung lobes is extracted by using an image morphology technology, to reduce the influences of false positive signals in a non-lobar area; each voxel is interpolated into 1 mm*1 mm*1 mm through a 3D interpolation method, to normalize all data into the same size of space; and the intensity of the image voxel is normalized into a range of 0 to 255.

According to this embodiment, pre-processing the target image can reduce the influences of useless information in the target image on the recognition result, and provide more accurate data for a target data model, improving accuracy of the object recognition.

In an optional implementation, before the pre-processing a target image, to obtain a pre-processed image, the foregoing method further includes:

S1. Obtain a plurality of sets of data, each of the plurality of sets of data including three-dimensional image information of a target region of a sample object and indication information corresponding to the three-dimensional image information, and the indication information being used for indicating whether an abnormality appears in a target object in the target region of the sample object.

S2. Train, by using the plurality of sets of data, the convolutional neural network that is based on structures of an encoder and a decoder, to obtain the target data model.

According to this embodiment, a convolutional neural network that is based on structures of an encoder and a decoder is trained by obtaining a plurality of sets of data, to obtain a target data model, providing model support for object recognition.

In an optional implementation, the determining a recognition result of the target region of the to-be-detected object according to the target probability includes:

S1. Select target probabilities that the abnormality appears in a target quantity of target objects.

S2. Determine a recognition result of the target region of the to-be-detected object through a Bayes's rule by using the selected target probabilities.

For example, 5 lung nodule candidate areas with highest confidence levels are selected from all candidate areas of lung nodules (the target objects), and the probabilities of invasion (the abnormality appears) and non-invasion of each candidate lung nodule are calculated. Then, general probabilities of the invasion (the abnormality appears) and the non-invasion of a lung cancer of a patient can be calculated with reference to the probabilities of the invasion of the 5 candidate lung nodules according to a Bayes's rule.

According to this embodiment, a calculation amount required when an electronic device determines the recognition result can be reduced by obtaining the target quantity of target objects, improving efficiency of object recognition.

In an optional implementation, after determining a recognition result of the target objects according to the calculated target probabilities, the foregoing method further includes:

S1. Transmit the recognition result of a target region of a to-be-detected object to a target device.

For example, an electronic device receives a CT medical image of a patient uploaded by medical staff through a target device of a hospital, to determine whether a lung cancer of the patient belongs to an invasive lung cancer or non-invasive lung cancer, and transmits the recognition result back to the target device of the hospital. Based on the recognition result of invasion and non-invasion, the medical staff can evaluate whether metastasis occurs in the lung cancer of the patient, and then use the recognition result as a reference factor for designing a treatment plan.

According to this embodiment, a reference for whether an abnormality appears in the target region can be offered by transmitting the recognition result back to the target device.

Figure 6:
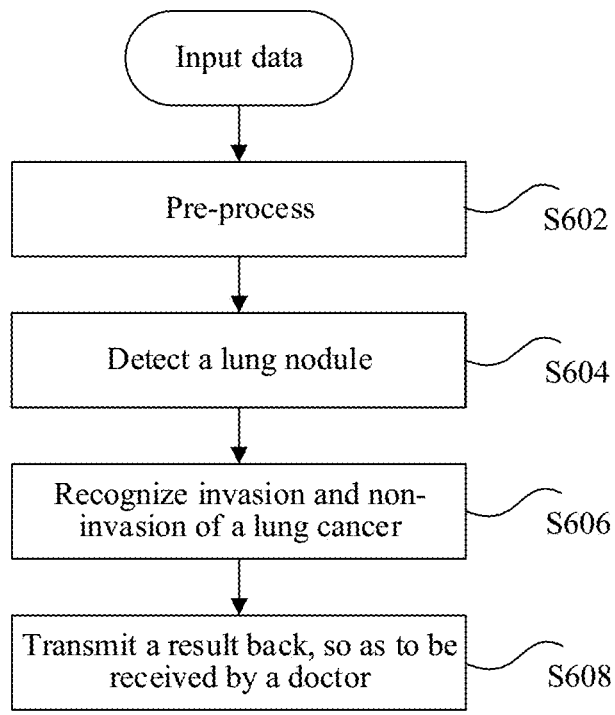
FIG. 6 is a schematic diagram of another optional object recognition method according to an embodiment of this application.

With reference to FIG. 6, the foregoing object recognition method is described below. Structures of a U-Net and residual blocks are integrated into a 3D convolutional neural network used in the object recognition method, the U-Net structure being composed by cascading a plurality of residual blocks: an encoder includes 4 residual blocks and 4 pooling layers, and a decoder includes 2 residual blocks and 2 deconvolution layers. The U-Net eliminates redundant information of high-dimensional input, reduces a dimension of the high-dimensional input and extracts an effective semantic feature through a series of pooling operations in an encoding stage; and recovers a resolution feature suitable for lung nodule detection from the semantic feature through a series of deconvolution operations in a decoding stage. A possible lung nodule candidate area is calculated through an anchor generation mechanism and then mapped to a last feature map of the U-Net. Recognition features corresponding to 5 lung nodules with highest confidence levels are extracted, and a general risk value of the invasion of the patient is calculated according to a Bayes's rule.

As shown in FIG. 6, according to step S602, a processor pre-processes an inputted CT image, to obtain a pre-processed image. According to step S604, the lung nodule detection is performed on the pre-processed image by using a U-Net network; the invasion or the non-invasion of the cancer of the lung nodule is recognized according to step S606; and then, according to step S608, the recognition result is transmitted back, so as to be received by a doctor.

According to the example, selecting the U-Net structure can flexibly customize a CNN network structure in combination with training tasks, and it is easier to combine convolution layer features of different resolutions, to improve a detection rate and accuracy of the lung nodules of different sizes, thereby improving the accuracy of recognition of the invasion and the non-invasion of the lung cancer.

For simple descriptions, the foregoing method embodiments are stated as a series of action combinations. However, it is to be appreciated by a person skilled in the art that this application is not limited to the sequence of the described actions because according to this application, some steps can be performed in another sequence or simultaneously. Secondly, the person skilled in the art is also to know that, all the embodiments described in the specification are exemplary embodiments, and the involved actions and modules are not necessarily required by the present disclosure.

According to the foregoing descriptions of implementations, the person skilled in the art can clearly know that the method according to the foregoing embodiments can be implemented by using software and a necessary general hardware platform, or certainly can be implemented by using hardware. However, in most cases, the former is a better implementation. Based on such an understanding, the technical solutions in this application essentially or the part contributing to the related art can be implemented in the form of a software product. The computer software product is stored in a storage medium (such as a read-only memory (ROM)/random access memory (RAM), a magnetic disk, or an optical disc), and includes several instructions for instructing a terminal device (which can be a mobile phone, a computer, a server, a network device, and the like) to perform the method described in the embodiments of the present disclosure.

Figure 7:
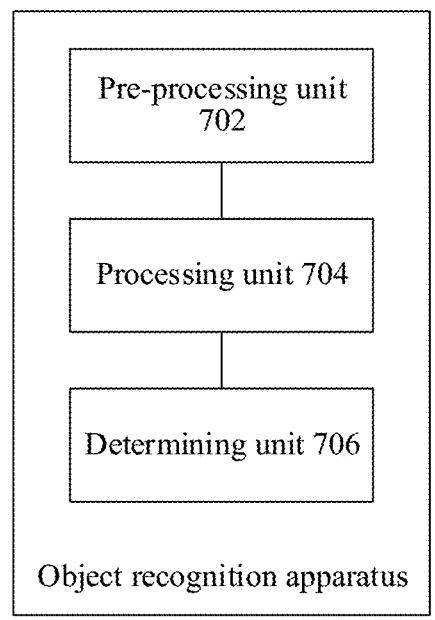
FIG. 7 is a schematic structural diagram of an optional object recognition apparatus according to an embodiment of this application.

According to another aspect of the embodiments of this application, an object recognition apparatus for implementing the foregoing object recognition method is further provided. As shown in FIG. 7, the apparatus includes:

a pre-processing unit 702, configured to pre-process a target image, to obtain a pre-processed image, the pre-processed image including three-dimensional image information of a target region of a to-be-detected object;

a processing unit 704, configured to process the pre-processed image by using a target data model, to obtain a target probability, the target probability being used for representing a probability that an abnormality appears in a target object in the target region of the to-be-detected object, and the target data model being obtained by training a convolutional neural network by using a plurality of sets of data; each of the plurality of sets of data including the three-dimensional image information of the target region of a sample object and indication information corresponding to the three-dimensional image information, the indication information being used for indicating whether the abnormality appears in the target object in the target region of the sample object, and the three-dimensional image information of the target region of the sample object being at least used for representing the target object in the target region of the sample object; and a determining unit 706, configured to determine a recognition result of the target region of the to-be-detected object according to the target probability, the recognition result being used for indicating the probability that the abnormality appears in the target region of the to-be-detected object.

In an optional implementation, the processing unit 704 includes:

(1) a processing module, configured to process the pre-processed image by using the target data model, to obtain the target object in the target region of the to-be-detected object;

(2) a determining module, configured to determine a target feature, the target feature being used for representing a target space range centered on the target object in the target region of the to-be-detected object; and (3) a calculation module, configured to calculate the target probability by using the target feature.

Optionally, the foregoing processing module includes:

(11) an extraction sub-module, configured to process the pre-processed image by using a first residual block and a pooling layer in the target data model, to extract a high-level semantic feature contained in the pre-processed image;

(12) a recovery sub-module, configured to process the high-level semantic feature by using a second residual block and a deconvolution layer in the target data model, to recover a resolution feature of the target object used for parsing a target resolution from the high-level semantic feature; and

(13) a parsing sub-module, configured to parse out the target object in the target region of the to-be-detected object according to the resolution feature.

According to this embodiment, the target data model applies a way of combining the convolutional neural network and the residual blocks, and addition of the residual blocks can improve the feature representation capability of the target data model, to prevent gradient vanishing and model degradation. Furthermore, by combining the feature layer information of different resolutions, the target data model can detect the target object more accurately, which helps to improve recognition accuracy of the abnormality of the target object.

In an optional implementation, the pre-processing unit 702 includes:

(1) an extraction module, configured to perform contour detection on the target image, and extract the target region of the to-be-detected object from the target image, to obtain an extracted image;

(2) an interpolation module, configured to interpolate each image voxel in the extracted image into a specified space size, to obtain an interpolated image; and (3) a normalization module, configured to normalize an intensity of each image voxel in the interpolated image into a target value, to obtain the pre-processed image.

According to this embodiment, pre-processing the target image can reduce the influences of useless information in the target image on the recognition result, and provide more accurate data for a target data model, improving accuracy of the object recognition.

In an optional implementation, the foregoing apparatus further includes:

(1) an obtaining unit, configured to obtain a plurality of sets of data, each of the plurality of sets of data including three-dimensional image information of a target region of a sample object and indication information corresponding to the three-dimensional image information, and the indication information being used for indicating whether an abnormality appears in a target object in the target region of the sample object; and (2) a training unit, configured to train, by using the plurality of sets of data, the convolutional neural network that is based on structures of an encoder and a decoder, to obtain the target data model.

According to this embodiment, a convolutional neural network that is based on structures of an encoder and a decoder is trained by obtaining a plurality of sets of data, to obtain a target data model, providing model support for object recognition.

In an optional implementation, the determining unit 706 includes:

(1) a selection subunit, configured to select target probabilities that the abnormality appears in a target quantity of target objects; and (2) a determining subunit, configured to determine the recognition result of the target region of the to-be-detected object according to a Bayes's rule by using the target probabilities that the abnormality appears in the selected target objects.

According to this embodiment, a calculation amount required when an electronic device determines the recognition result can be reduced by obtaining the target quantity of target objects, improving efficiency of object recognition.

In an optional implementation, the foregoing apparatus further includes:

(1) a transmission unit, configured to transmit the recognition result to a target device after the recognition result of the target object is determined.

According to this embodiment, a reference for whether an abnormality appears in the target region can be offered by transmitting the recognition result back to the target device.

According to still another aspect of the embodiments of this application, a storage medium is further provided. The storage medium stores a computer program, the computer program being configured to perform, when run, steps in any one of the foregoing method embodiments.

Optionally, in this embodiment, the foregoing storage medium can be configured to store a computer program for performing the following steps:

S1. Pre-process a target image, to obtain a pre-processed image, the pre-processed image including three-dimensional image information of a target region of a to-be-detected object.

S2. Process the pre-processed image by using a target data model, to obtain a target probability, the target probability being used for representing a probability that an abnormality appears in a target object in the target region of the to-be-detected object, and the target data model being obtained by training a convolutional neural network by using a plurality of sets of data; each of the plurality of sets of data including the three-dimensional image information of the target region of a sample object and indication information corresponding to the three-dimensional image information, the indication information being used for indicating whether the abnormality appears in the target object in the target region of the sample object, and the three-dimensional image information of the target region of the sample object being at least used for representing the target object in the target region of the sample object.

S3. Determine a recognition result of the target region of the to-be-detected object according to the target probability, the recognition result being used for indicating the probability that the abnormality appears in the target region of the to-be-detected object.

Optionally, in this embodiment, the foregoing storage medium can be configured to store a computer program for performing the following steps:

S1. Process the pre-processed image by using the target data model, to obtain the target object in the target region of the to-be-detected object.

S2. Determine a target feature, the target feature being used for representing a target space range centered on the target object in the target region of the to-be-detected object.

S3. Calculate the target probability by using the target feature.

Optionally, in this embodiment, the foregoing storage medium can be configured to store a computer program for performing the following steps:

S1. Process a pre-processed image by using a first residual block and a pooling layer in a target data model, to extract a high-level semantic feature contained in the pre-processed image.

S2. Process the high-level semantic feature by using a second residual block and a deconvolution layer in the target data model, to recover a resolution feature of a target object used for parsing a target resolution from the high-level semantic feature.

S4. Parse out the target object in the target region of the to-be-detected object according to the resolution feature.

Optionally, in this embodiment, the foregoing storage medium can be configured to store a computer program for performing the following steps:

S1. Perform contour detection on the target image, and extract a target region of a to-be-detected object from the target image, to obtain an extracted image.

S2. Interpolate each image voxel in the extracted image into a specified space size, to obtain an interpolated image.

S3. Normalize an intensity of each image voxel in the interpolated image into a target value, to obtain the pre-processed image.

Optionally, in this embodiment, the foregoing storage medium can be configured to store a computer program for performing the following steps:

S1. Obtain a plurality of sets of data, before the pre-processing a target image, to obtain a pre-processed image.

S2. Train, by using the plurality of sets of data, the convolutional neural network that is based on structures of an encoder and a decoder, to obtain the target data model.

Optionally, in this embodiment, the foregoing storage medium can be configured to store a computer program for performing the following steps:

S1. Select target probabilities that the abnormality appears in a target quantity of target objects.

S2. Determine a recognition result of the target region of the to-be-detected object through a Bayes's rule by using the selected target probabilities.

Optionally, in this embodiment, the foregoing storage medium can be configured to store a computer program for performing the following step:

S1. Transmit a recognition result of a target region of a to-be-detected object to a target device after determining the recognition result of a target object.

Optionally, in this embodiment, a person of ordinary skill in the art can understand that all or part of the steps of the methods in the foregoing embodiments can be implemented by a program by instructing hardware relevant to a terminal device. The program can be stored in a computer-readable storage medium, and the storage medium can include a flash drive, a ROM (Read-Only Memory), a RAM (Random Access Memory), a magnetic disk, an optical disc, and the like.

Figure 8:
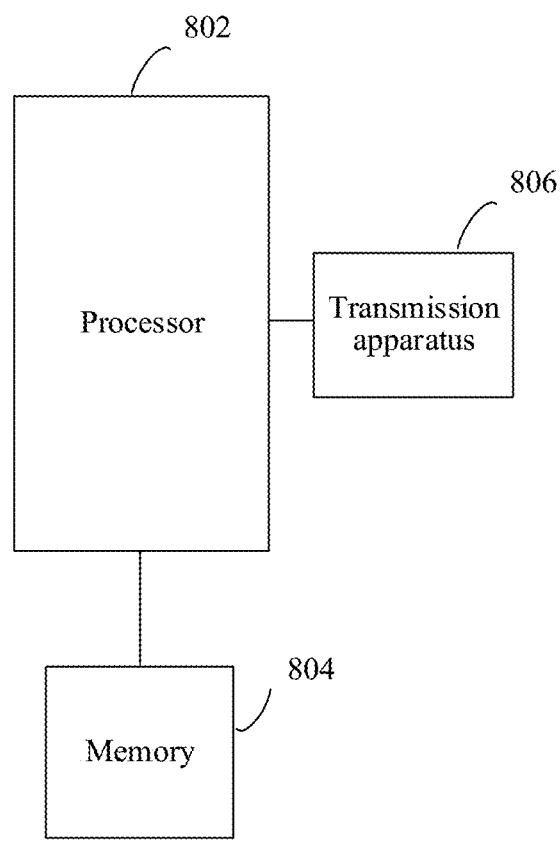
FIG. 8 is a schematic structural diagram of an optional electronic device according to an embodiment of this application.

According to still another aspect of the embodiments of this application, an electronic device configured to implement the foregoing object recognition method is further provided. As shown in FIG. 8, the electronic device includes: a processor 802, a memory 804, and a transmission apparatus 806. The memory stores a computer program, and the processor is configured to perform steps in any one of the foregoing method embodiments through the computer program.

Optionally, in this embodiment, the foregoing electronic device can be located in at least one of a plurality of network devices in a computer network.

Optionally, in this embodiment, the foregoing processor can be configured to perform, through the computer program, the following steps:

S1. Pre-process a target image, to obtain a pre-processed image, the pre-processed image including three-dimensional image information of a target region of a to-be-detected object.

S2. Process the pre-processed image by using a target data model, to obtain a target probability, the target probability being used for representing a probability that an abnormality appears in a target object in the target region of the to-be-detected object, and the target data model being obtained by training a convolutional neural network by using a plurality of sets of data; each of the plurality of sets of data including the three-dimensional image information of the target region of a sample object and indication information corresponding to the three-dimensional image information, the indication information being used for indicating whether the abnormality appears in the target object in the target region of the sample object, and the three-dimensional image information of the target region of the sample object being at least used for representing the target object in the target region of the sample object.

S3. Determine a recognition result of the target region of the to-be-detected object according to the target probability, the recognition result being used for indicating the probability that the abnormality appears in the target region of the to-be-detected object.

Optionally, a person of ordinary skill in the art can understand that, the structure shown in FIG. 8 is only illustrative. The electronic device can be a terminal device such as a smartphone (for example, an Android mobile phone or an iOS mobile phone), a tablet computer, a palmtop computer, a mobile Internet device (MID), or a portable android device (PAD). FIG. 8 does not constitute a limitation on a structure of the foregoing electronic device. For example, the electronic device can further include more or fewer components (such a network interface, and the like) than those shown in FIG. 8, or has a configuration different from that shown in FIG. 8.

The memory 804 can be configured to store a software program and a module, for example, a program instruction/module corresponding to the object recognition method and apparatus in the embodiments of this application, and the processor 802 performs various functional applications and data processing by running a software program and a module stored in the memory 804, that is, implementing the foregoing object recognition method. The memory 804 can include a high speed random access memory, and can further include a non-transitory memory, for example, one or more magnetic storage apparatuses, a flash memory, or another non-transitory solid-state memory. In some embodiments, the memory 804 can further include memories remotely disposed relative to the processor 802, and the remote memories can be connected to a terminal by using a network. An example of the foregoing network includes, but is not limited to, the Internet, an intranet, a local area network, a mobile communications network and a combination thereof.

The foregoing transmission apparatus 806 is configured to receive or transmit data through a network. Specific examples of the foregoing network can include a wired network and a wireless network. In an example, the transmission apparatus 806 includes a network interface controller (NIC) that can be connected to another network device and router by using a cable, to communicate with the Internet or a local area network. In an embodiment, the transmission apparatus 806 is a radio frequency (RF) module that is configured to communicate with the Internet in a wireless manner.

According to yet still another aspect of the embodiments of this application, a computer program product used for implementing the foregoing object recognition method is provided, including an instruction, the instruction, when run on a computer, causing the computer to perform steps in the object recognition method according to any one of embodiments of this application.

The sequence numbers of the foregoing embodiments of this application are merely for convenience of description, and do not imply preference among the embodiments.

In a case that the integrated unit in the foregoing embodiments is implemented in the form of a software function unit and sold or used as an independent product, the integrated unit can be stored in the foregoing non-transitory computer-readable storage medium. Based on such an understanding, the technical solution of this application essentially, or a part contributing to the related art, or all or a part of the technical solution can be implemented in a form of a software product. The computer software product is stored in a non-transitory computer-readable storage medium and includes several instructions for instructing one or more computer devices (which can be a personal computer, a server, a network device, or the like) to perform all or some of steps of the methods in the embodiments of this application.

In the foregoing embodiments of this application, descriptions of the embodiments have different emphases. As for parts that are not described in detail in one embodiment, reference can be made to the relevant descriptions of the other embodiments.

In the several embodiments provided in this application, it is to be understood that the disclosed client can be implemented in other manners. The apparatus embodiments described above are merely exemplary. For example, the division of the units is merely the division of logic functions, and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of this application can be integrated into one processing unit, or each of the units can exist alone physically, or two or more units are integrated into one unit. The foregoing integrated unit can be implemented in the form of hardware, or can be implemented in the form of a software function unit.

The foregoing descriptions are merely exemplary implementations of this application. A person of ordinary skill in the art can further make several improvements and refinements without departing from the principle of this application, and the improvements and refinements shall fall within the protection scope of this application.

What is claimed is:

1. An object recognition method, applied to an electronic device having a processor and memory storing a plurality of operations to be executed by the processor, the method comprising:
    pre-processing a target image to obtain a pre-processed image, the pre-processed image comprising three-dimensional image information of a target region of a to-be-detected object;
    processing the pre-processed image using a target data model to obtain a target object in the target region of the to-be-detected object, wherein:
        the target data model is obtained by training a convolutional neural network using a plurality of sets of data, each of the plurality of sets of data comprising three-dimensional image information of a target region of a sample object and indication information corresponding to the three-dimensional image information, the indication information being used for indicating whether an abnormality appears in the target region of the sample object, and the three-dimensional image information of the target region of the sample object being at least used for representing the target object in the target region of the sample object; and
        the processing includes:
            processing the pre-processed image using a first residual block and a pooling layer in the target data model, to extract a high-level semantic feature contained in the pre-processed image;
            processing the high-level semantic feature using a second residual block and a deconvolution layer in the target data model, to recover a resolution feature of the target object; and
            identifying the target object in the target region of the to-be-detected object and determining a probability that the target object constitutes an abnormality according to the resolution feature.

2. The method according to claim 1, wherein processing the pre-processed image using the target data model further includes:
    determining a target feature in the pre-processed image, the target feature being used for representing a target space range centered on the target object in the target region of the to-be-detected object; and
    calculating the probability using the target feature.

3. The method according to claim 1, wherein pre-processing the target image to obtain a pre-processed image comprises:
    performing contour detection on the target image, and extracting the target region of the to-be-detected object from the target image according to the contour detection, to obtain an extracted image;
    interpolating each image voxel in the extracted image into a specified space size, to obtain an interpolated image; and
    normalizing an intensity of each image voxel in the interpolated image into a target value, to obtain the pre-processed image.

4. The method according to claim 1, further comprising before the pre-processing:
    obtaining the plurality of sets of data; and
    training, by using the plurality of sets of data, the convolutional neural network that is based on structures of an encoder and a decoder, to obtain the target data model.

5. The method according to claim 1, wherein determining a probability that the target object constitutes an abnormality includes:
    selecting target probabilities that the abnormality appears in a target quantity of target objects; and
    determining the probability according to a Bayes's rule by using the selected target probabilities.

6. The method according to claim 1, further comprising after determining the probability,
    transmitting the probability to a target device.

7. An electronic device, comprising:
    a processor; and
    memory, the memory storing a plurality of programs that, when executed by the processor, cause the processor to perform a plurality of operations including:
        pre-processing a target image, to obtain a pre-processed image, the pre-processed image comprising three-dimensional image information of a target region of a to-be-detected object;
        processing the pre-processed image using a target data model to obtain a target object in the target region of the to-be-detected object, wherein:
            the target data model is obtained by training a convolutional neural network using a plurality of sets of data, each of the plurality of sets of data comprising three-dimensional image information of a target region of a sample object and indication information corresponding to the three-dimensional image information, the indication information being used for indicating whether an abnormality appears in the target region of the sample object, and the three-dimensional image information of the target region of the sample object being at least used for representing the target object in the target region of the sample object; and
            the processing includes:
                processing the pre-processed image using a first residual block and a pooling layer in the target data model, to extract a high-level semantic feature contained in the pre-processed image;
                processing the high-level semantic feature using a second residual block and a deconvolution layer in the target data model, to recover a resolution feature of the target object; and
                identifying the target object in the target region of the to-be-detected object and determining a probability that the target object constitutes an abnormality according to the resolution feature.

8. The electronic device according to claim 7, wherein processing the pre-processed image using the target data model further includes:
   determining a target feature in the pre-processed image, the target feature being used for representing a target space range centered on the target object in the target region of the to-be-detected object; and
   calculating the probability using the target feature.

9. The electronic device according to claim 7, wherein pre-processing the target image to obtain a pre-processed image comprises:
   performing contour detection on the target image, and extracting the target region of the to-be-detected object from the target image according to the contour detection, to obtain an extracted image;
   interpolating each image voxel in the extracted image into a specified space size, to obtain an interpolated image; and
   normalizing an intensity of each image voxel in the interpolated image into a target value, to obtain the pre-processed image.

10. The electronic device according to claim 7, wherein the plurality of operations further comprise:
    before the pre-processing:
    obtaining the plurality of sets of data; and
    training, by using the plurality of sets of data, the convolutional neural network that is based on structures of an encoder and a decoder, to obtain the target data model.

11. The electronic device according to claim 7, wherein determining a probability that the target object constitutes an abnormality includes:
    selecting target probabilities that the abnormality appears in a target quantity of target objects; and
    determining the probability according to a Bayes's rule by using the selected target probabilities.

12. The electronic device according to claim 7, wherein the plurality of operations further comprise:
    after determining the probability, transmitting the probability to a target device.

13. A non-transitory computer-readable storage medium, storing a plurality of computer programs, the computer programs, when executed by an electronic device having a processor, causing the processor to perform a plurality of operations including:
    pre-processing a target image, to obtain a pre-processed image, the pre-processed image comprising three-dimensional image information of a target region of a to-be-detected object;
    processing the pre-processed image using a target data model to obtain a target object in the target region of the to-be-detected object, wherein:
    the target data model is obtained by training a convolutional neural network using a plurality of sets of data, each of the plurality of sets of data comprising three-dimensional image information of a target region of a sample object and indication information corresponding to the three-dimensional image information, the indication information being used for indicating whether an abnormality appears in the target region of the sample object, and the three-dimensional image information of the target region of the sample object being at least used for representing the target object in the target region of the sample object; and
    the processing includes:
    processing the pre-processed image using a first residual block and a pooling layer in the target data model, to extract a high-level semantic feature contained in the pre-processed image;
    processing the high-level semantic feature using a second residual block and a deconvolution layer in the target data model, to recover a resolution feature of the target object; and
    identifying the target object in the target region of the to-be-detected object and determining a probability that the target object constitutes an abnormality according to the resolution feature.

14. The non-transitory computer-readable storage medium according to claim 13, wherein processing the pre-processed image using the target data model further includes:
    determining a target feature in the pre-processed image, the target feature being used for representing a target space range centered on the target object in the target region of the to-be-detected object; and
    calculating the probability using the target feature.

15. The non-transitory computer-readable storage medium according to claim 13, wherein pre-processing the target image to obtain a pre-processed image comprises:
    performing contour detection on the target image, and extracting the target region of the to-be-detected object from the target image according to the contour detection, to obtain an extracted image;
    interpolating each image voxel in the extracted image into a specified space size, to obtain an interpolated image; and
    normalizing an intensity of each image voxel in the interpolated image into a target value, to obtain the pre-processed image.

16. The non-transitory computer-readable storage medium according to claim 13, wherein the plurality of operations further comprise:
    before the pre-processing:
    obtaining the plurality of sets of data; and
    training, by using the plurality of sets of data, the convolutional neural network that is based on structures of an encoder and a decoder, to obtain the target data model.

17. The non-transitory computer-readable storage medium according to claim 13, wherein determining a probability that the target object constitutes an abnormality includes:
    selecting target probabilities that the abnormality appears in a target quantity of target objects; and
    determining the probability according to a Bayes's rule by using the selected target probabilities.

18. The non-transitory computer-readable storage medium according to claim 13, wherein the plurality of operations further comprise:
    after determining the probability, transmitting the probability to a target device.

* * * * *